United States Patent
Keskula et al.

(10) Patent No.: US 6,670,064 B2
(45) Date of Patent: Dec. 30, 2003

(54) AIR SUPPLY PRESSURE SETPOINT DETERMINATION FOR A FUEL CELL POWER MODULE

(75) Inventors: Donald H. Keskula, Webster, NY (US); Victor W. Logan, Naples, NY (US); Bruce J. Clingerman, Palmyra, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/136,848

(22) Filed: Apr. 30, 2002

(65) Prior Publication Data

US 2003/0203257 A1 Oct. 30, 2003

(51) Int. Cl.$^7$ ................................................ H01M 8/04

(52) U.S. Cl. .............................. 429/25; 429/22; 429/34

(58) Field of Search ................................ 429/25, 34, 22

(56) References Cited

U.S. PATENT DOCUMENTS

| | | | | |
|---|---|---|---|---|
| 4,838,020 A | * | 6/1989 | Fujitsuka | 429/25 X |
| 2002/0034669 A1 | * | 3/2002 | Kobayashi et al. | 429/25 |
| 2002/0039672 A1 | * | 4/2002 | Aramaki | 429/22 |

* cited by examiner

Primary Examiner—John S. Maples
(74) Attorney, Agent, or Firm—Karl F. Barr, Jr.; Cary W. Brooks; Linda M. Deschere (57) ABSTRACT

An air control system and method for a fuel cell system includes a manifold, a air delivery device that supplies air to the manifold, and a plurality of fuel cell components. A plurality of flow controllers (FCs) control airflow from the manifold to the fuel cell components. A controller communicates with the FCs and the air delivery device and generates a manifold pressure setpoint based on a first factor that is related to fuel cell system stability and a second factor that is a based on minimum and maximum pressures of the air delivery device for a predetermined airflow. If the first and second factors are met, the controller optionally generates the manifold pressure setpoint based on a third factor that is related to fuel cell system efficiency.

19 Claims, 7 Drawing Sheets

AIR SUPPLY PRESSURE SETPOINT DETERMINATION FOR A FUEL CELL POWER MODULE

FIELD OF THE INVENTION

The present invention relates to systems including fuel cells, and more particularly to an air control system for a system including a fuel cell.

BACKGROUND OF THE INVENTION

Systems such as vehicles and stationary power plants use fuel cell systems to generate power. In many fuel cell systems, several different components may require a controlled airflow. An air delivery device such as a compressor typically supplies air to a manifold. Flow controllers (FCs) are coupled to outputs of the manifold. The air delivery device maintains a desired manifold pressure, which is used to supply the fuel cell components. A flow controllers (FCs) control airflow to the fuel cell components. A system controller calculates a manifold pressure setpoint, which is used to control the air delivery device. Conventional fuel cell systems typically control the air delivery device by controlling to a desired airflow.

SUMMARY OF THE INVENTION

An air control system and method according to the present invention for a fuel cell system includes a manifold, a air delivery device that supplies air to the manifold, and a plurality of fuel cell components. A plurality of flow controllers (FCs) control airflow from the manifold to the fuel cell components. A controller communicates with the FCs and the air delivery device and generates a manifold pressure setpoint based on a first factor that is related to fuel cell system stability and a second factor that is a based on minimum and maximum pressures of the air delivery device for a predetermined airflow.

In other features, the controller generates the manifold pressure setpoint based on a third factor that is related to fuel cell system efficiency. When the controller calculates the first factor, the controller uses a first mass flow signal of a first FC of a first component to look up a first delta pressure minimum in a first table, adds the first delta pressure minimum to a first pressure of air delivered to the first component, and generates a first pressure minimum.

In still other features, when the controller calculates the first factor, the controller uses a second mass flow signal of a second FC of a second component to look up a second delta pressure minimum in a second table, adds the second delta pressure minimum to a second pressure of air delivered to the second component, and generates a second pressure minimum.

In yet other features, a first maximum selecting circuit selects a first maximum value of inputs thereto. The first and second pressure minimums are input to the first maximum selecting circuit. A summing circuit sums inputs thereto. The first and second mass flow signals are input to the summing circuit.

In still other features, an upper limit table generates a high pressure limit for the air delivery device based on the summed mass flow signals. A first minimum selecting circuit selects a first minimum value of the first maximum value and the upper pressure limit. A lower limit table generates a low pressure limit for the air delivery device based on the summed mass flow signals. A second maximum selecting circuit selects a second maximum value of inputs thereto. The lower pressure limit and the first minimum value are input to the second maximum selecting circuit.

In still other features, an efficiency table provides an efficiency pressure valve based on the summed mass flow signals. A third maximum selecting circuit selects a third maximum value based on the efficiency pressure valve and the second maximum value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numerals will be used in the drawings to identify similar elements.

Figure 1:
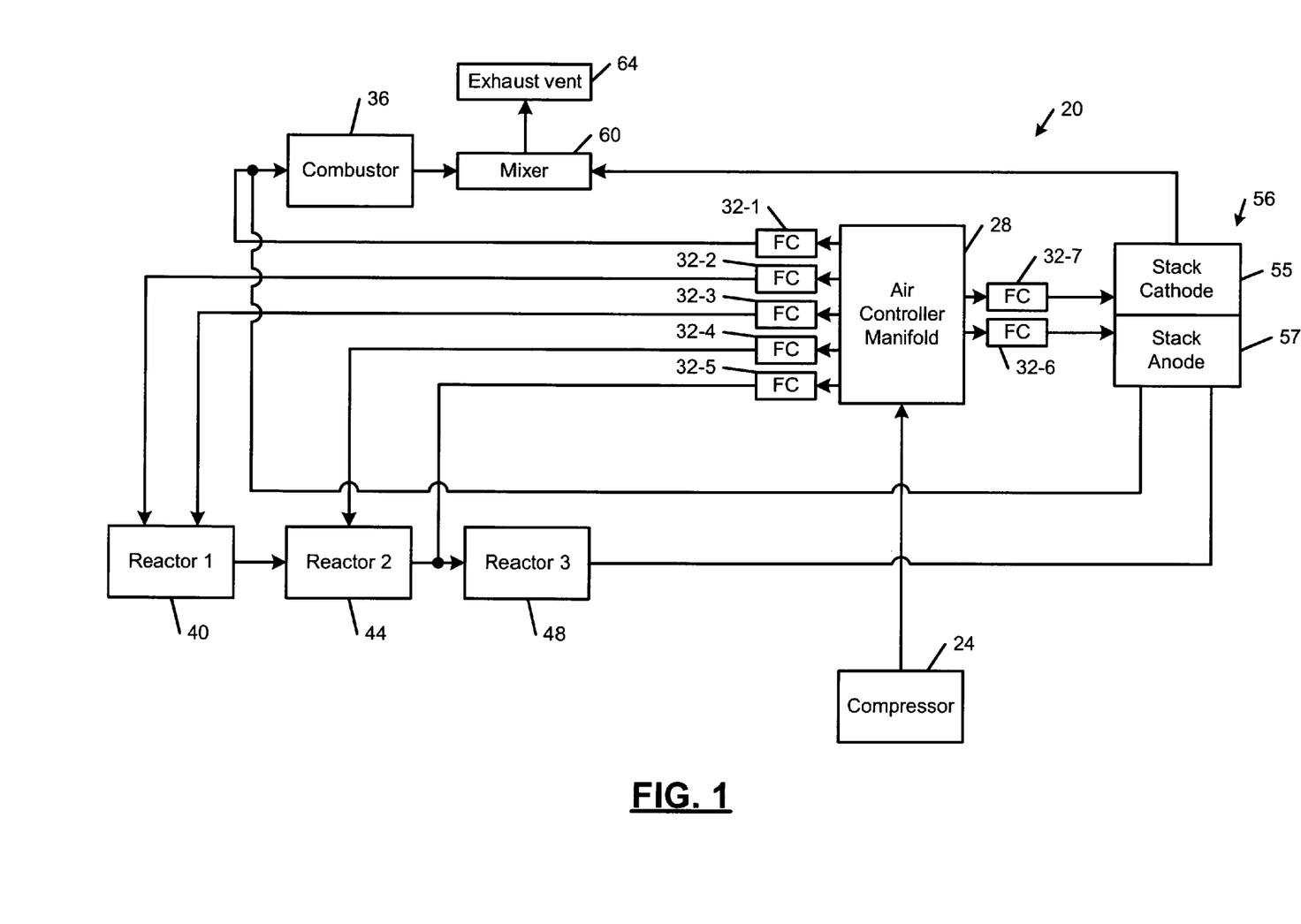
FIG. 1 is a functional block diagram of an air subsystem for a first exemplary fuel cell system.

Referring now to FIG. 1, an air subsystem 20 for a fuel cell system is shown. An air delivery device 24 supplies air to a manifold 28. The air delivery device can be a compressor, blowers, turbochargers, plasma air movers, or any other suitable device that supplies air. One or more flow controllers (FCs) 32-1, 32-2, . . . , and 32-n control the flow of air from the manifold 28 to components of the fuel cell system. The FCs 32 can be mass flow controllers, volumetric flow controllers, or any other type of flow controller.

For example, a first FC 32-1 controls the flow of air to a combustor 36. Second and third FC 32-2 and 32-3 control the flow of air to a first reactor 40. A fourth FC 32-4 controls the flow of air to a second reactor 44. A fifth FC 32-5 controls the flow air to a third reactor 48. A sixth FC 32-6 controls the flow of air to an anode 55 of a fuel cell stack 56. A seventh FC 32-7 controls the flow of air to a cathode 57 of the fuel cell stack 56. The output of the combustor 36 is merged with an output of the cathode of the fuel cell stack 56 and passed to an exhaust vent 64.

Figure 2:
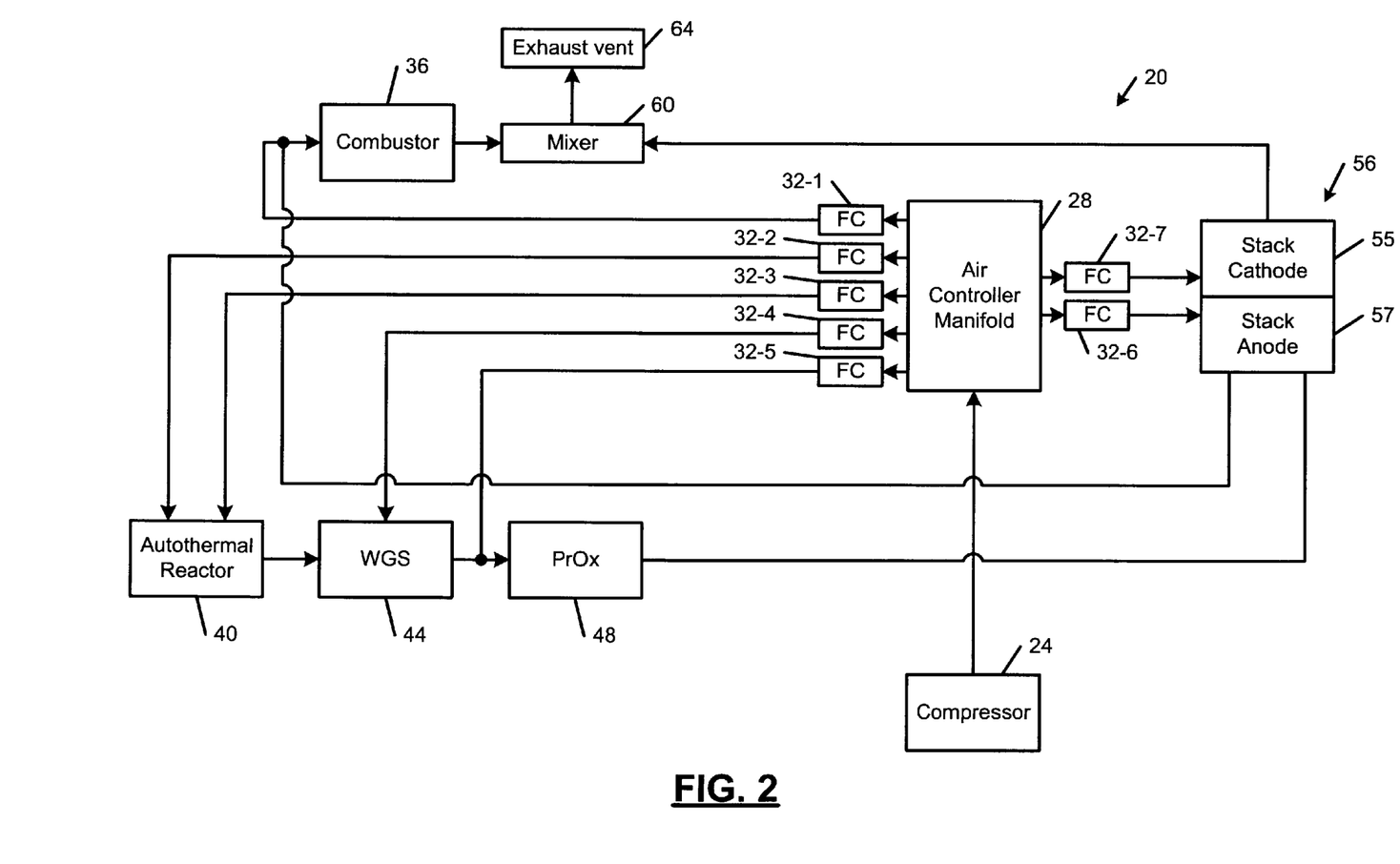
FIG. 2 is a functional block diagram of the air subsystem of FIG. 1 in further detail.

Referring now to FIG. 2, the first reactor 40 can be an autothermal reactor which includes a partial oxidizer (POx) and a steam reformer as shown at 40'. The second reactor 44 can be a water gas shift (WGS) reactor as shown at 44'. The third reactor 48 can be a preferential oxidizer (PrOx) as shown at 48'. As can be appreciated by skilled artisans, the present invention discloses an improved air control system for an exemplary fuel cell system. While the present invention is being illustrated in connection with a particular fuel cell system, skilled artisans will appreciate that the fuel cell system may be varied without departing from the scope of the present invention.

An air manifold pressure setpoint is determined according to the present invention using three factors. The factors can have different priorities. A first factor relates to physical limitations of the air delivery device 24. The air delivery device 24 should be operated within certain boundaries, which are specific to the type of air delivery device 24, to prevent damage or undesirable operating conditions like stall or surge. In a preferred embodiment, a LUT determines a minimum and maximum allowed manifold pressure setpoint based on total mass airflow.

A second factor is to maintain system stability. System stability is maintained by satisfying minimum pressure requirements for the branch air FCs 32. The minimum pressure requirements for the branch air FCs are preferably referenced using a look-up table for all branches that affect system stability. A maximum of the minimum pressures is used as the minimum air manifold pressure setpoint required to maintain system stability.

Figure 3:
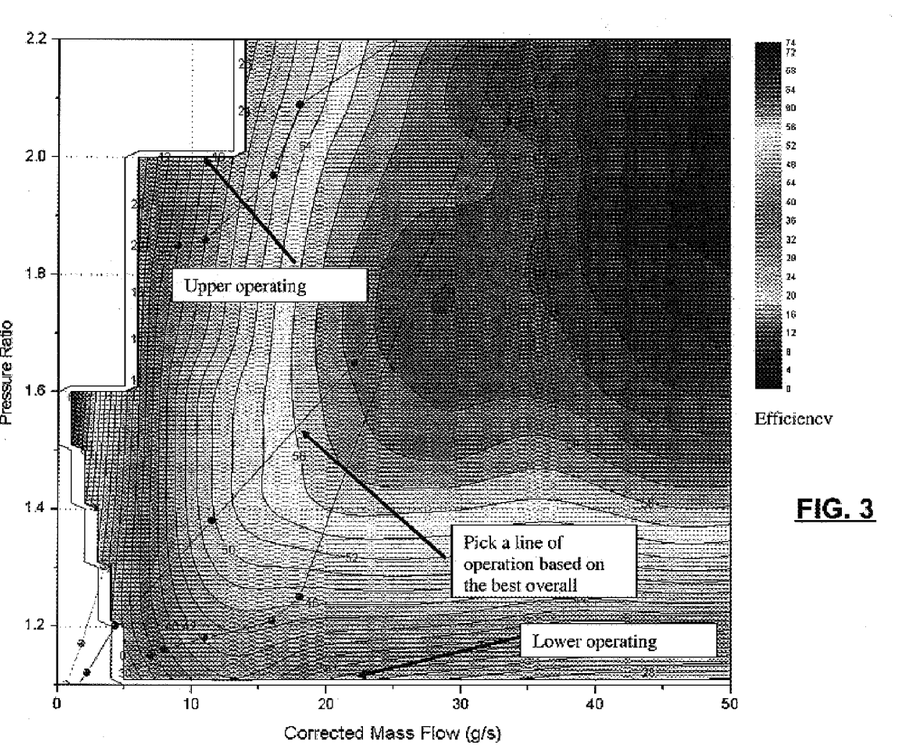
FIG. 3 is a graph illustrating air delivery device efficiency as a function of mass flow rate and pressure ratio.

A third factor relates to system efficiency. System efficiency is accomplished by operating the air delivery device 24 to minimizes losses. Referring now to FIG. 3, the efficiency of the air delivery device 24 is shown as a function of mass flow rate and pressure ratio. A LUT of optimal pressure ratios is referenced for the total requested airflow of the system. Alternately, the optimum pressure ratio can be model-based. The model preferably considers system trade-offs. For example, the air delivery device 24 may operate more efficiently at lower pressures while the fuel cell stack may operate more efficiently at a higher pressure. The system trade-offs can be determined by the controller 100. In a preferred embodiment, as long as the first and second factors are met, the manifold pressure setpoint is allowed to adjust within criteria determined by the first and second factors to optimize efficiency.

Figure 4:
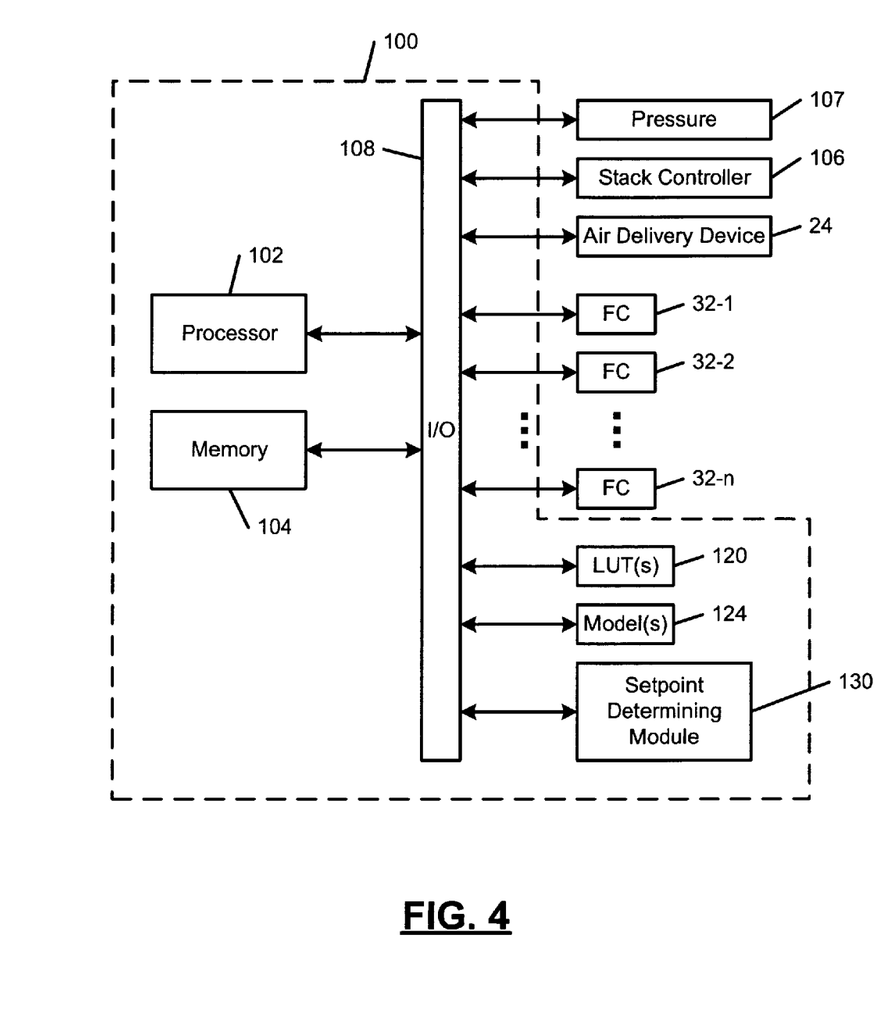
FIG. 4 is a functional block diagram of an exemplary controller for the air subsystem.

Referring now to FIG. 4, a controller 100 for the air subsystem is shown and includes a processor 102 and memory 104 (such as read-only memory (ROM), random access memory (RAM), flash memory, or any other suitable electronic storage). The air delivery device 24, a stack controller 106, a manifold pressure sensor 107, and the FCs 32 are connected to an input/output (I/O) interface 108. As can be appreciated, the controller 100 and the stack controller 106 may be combined into a single controller if desired. Alternately, additional controllers may be employed. One or more LUTs 120 and/or models 124 may be employed. A setpoint determining module 130 generates the air manifold setpoint based on the LUTs 120 and/or the models 124.

Figure 5:
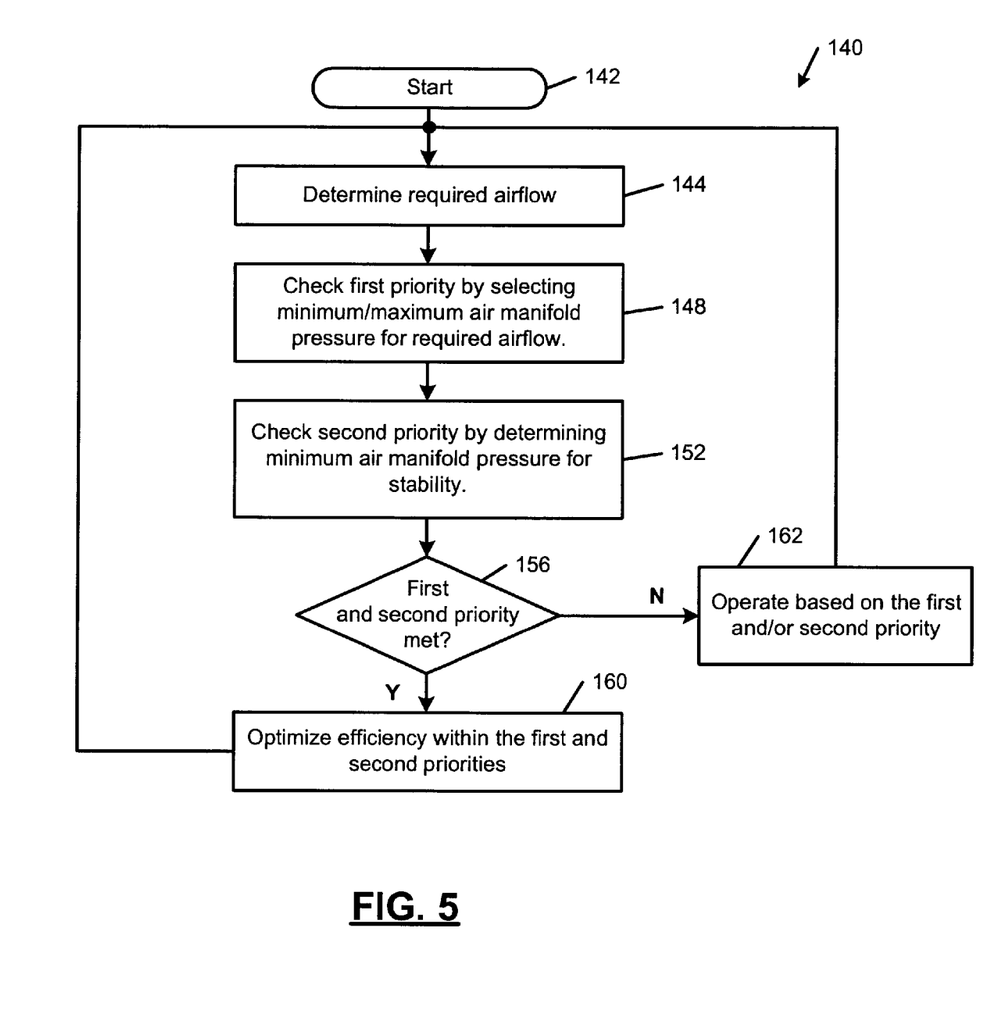
FIG. 5 illustrates steps performed by the controller to generate an air manifold pressure setpoint.

Referring now to FIG. 5, steps for calculating the manifold pressure setpoint are shown generally at 140. Control begins with step 142. In step 144, the required airflow is determined. In step 148, the first factor is analyzed by selecting minimum and maximum air manifold pressures for the required airflow. In step 152, the second factor is analyzed by determining a minimum air manifold pressure for system stability. In step 156, the controller 100 determines whether the first and second factors are met. If true, control continues with step 160 and optimizes efficiency (the third factor). Otherwise, control operates based on the first and/or second factors in step 162. Control loops from steps 160 and 162 back to step 144.

Figure 6:
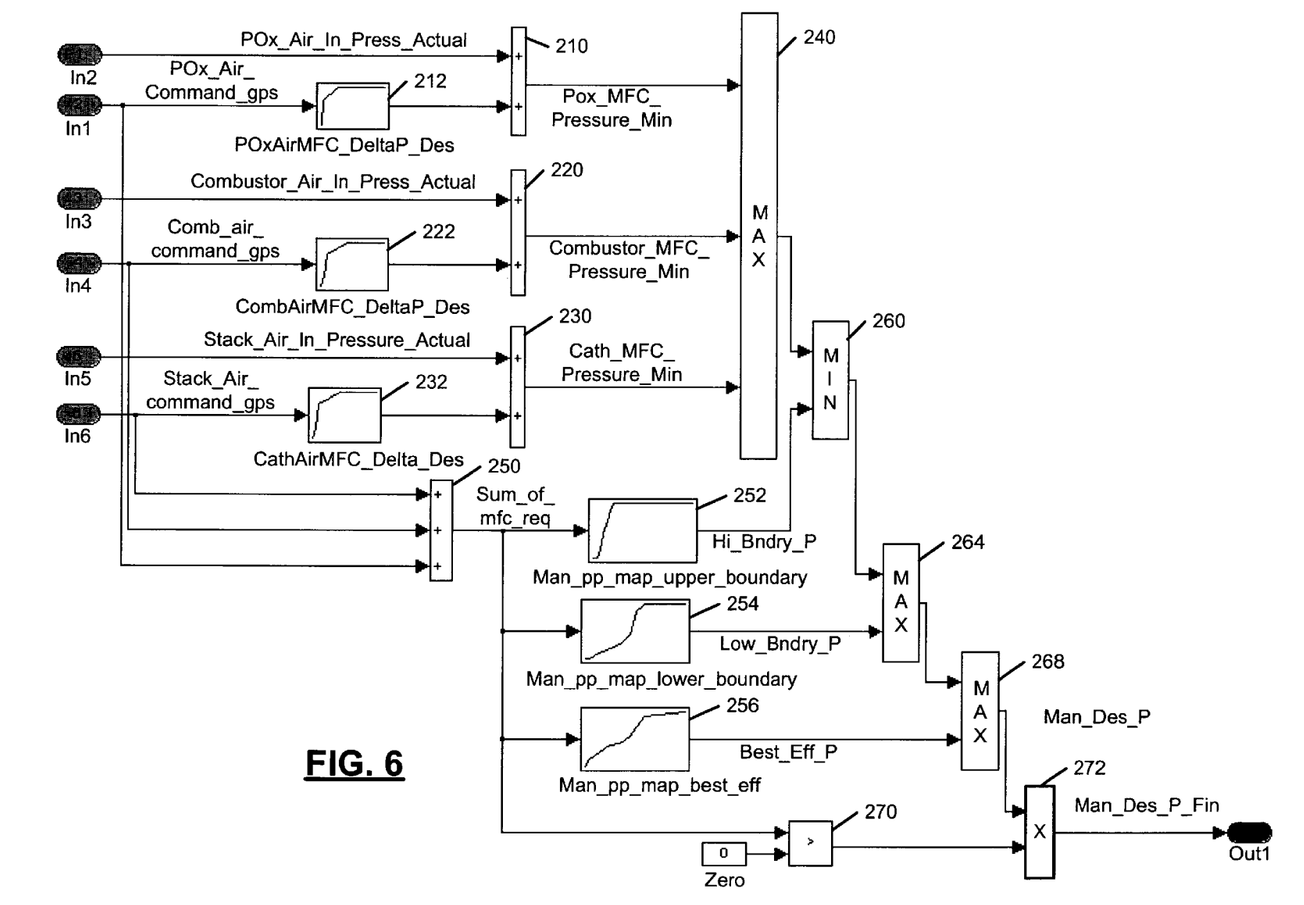
FIG. 6 is a first signal flow diagram for generating the manifold pressure setpoint for the air control system.
Figure 7:
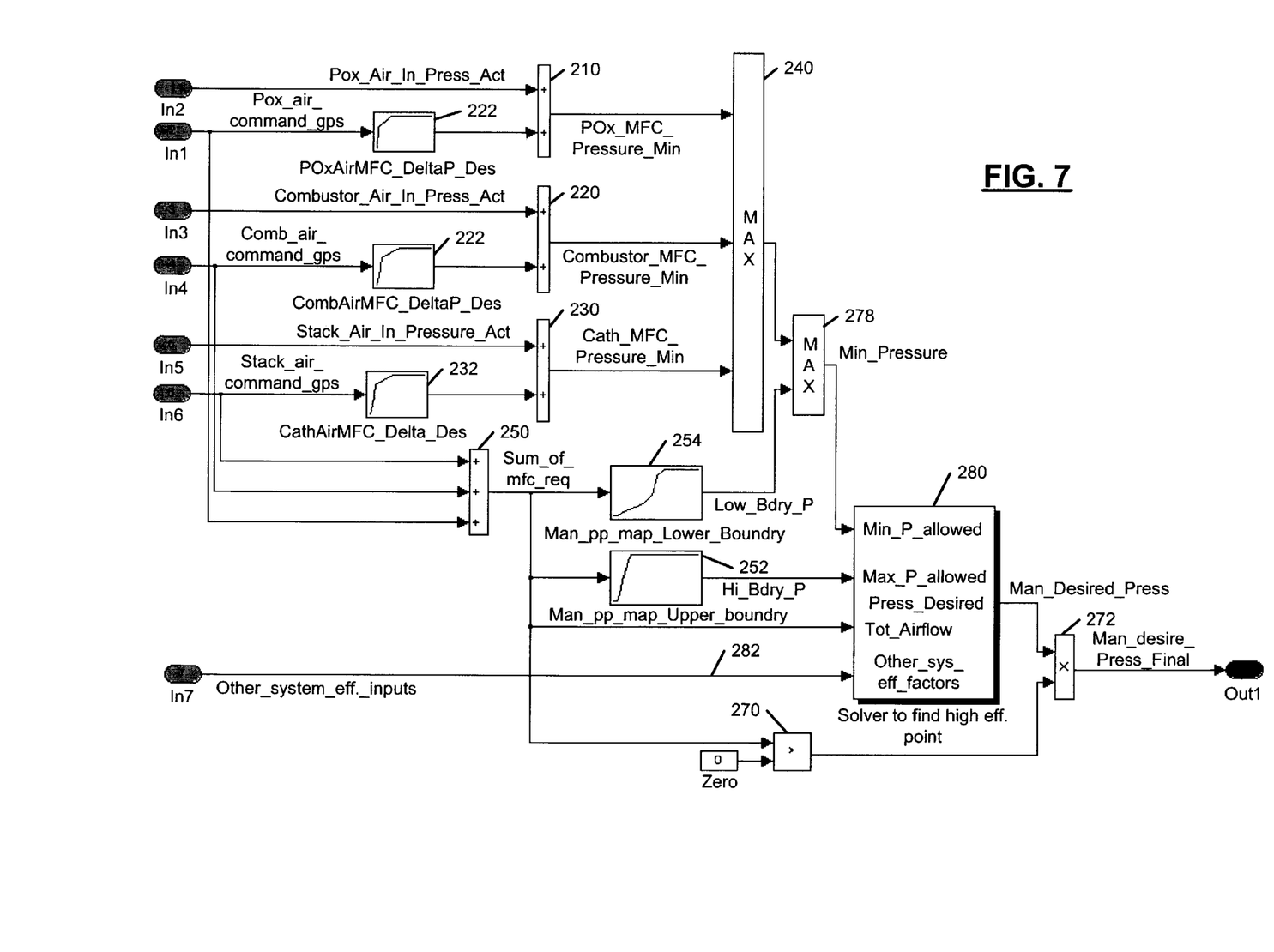
FIG. 7 is a second signal flow diagram for generating the manifold pressure setpoint for the air control system.

Referring now to FIGS. 6 and 7, signal flows of first and second exemplary air subsystem manifold pressure setpoint strategies are shown. The controller 100 checks airflow branch requirements, makes sure that the manifold pressure is within the air delivery device boundaries, and selects a manifold pressure setpoint that provides the best efficiency point. There are many ways to achieve this result. For example, FIG. 6 uses min/max logic that is table based. In FIG. 7, an iterative solver is used when system trade-offs become complex.

Referring now to FIG. 6, a partial oxidizer pressure (either actual or modeled) is input to an adder 210. A FC command signal for the FC 32 that is associated with the partial oxidizer is also input to a LUT 212. The LUT calculates AP. Valve area is controlled by the mass flow command signals. The flow of the FC is a function of valve area and AP.

An output of the LUT 212 is input to the adder 210. An output of the adder 210 is a manifold pressure minimum to satisfy the partial oxidizer FC. Adder 220 and LUT 222 generate a manifold pressure minimum to satisfy for the combustor FC. Adder 230 and LUT 232 generate a manifold pressure minimum to satisfy the fuel cell stack FC. A maximum selector circuit 240 selects a maximum value of the minimum pressures from the adders 210, 220 and 230.

The command signals from the FCs 32 are input to an adder 250. An output of the adder 250 is input to LUTs 252, 254, and 256. The LUT 252 selects an upper limit for the manifold pressure based on the summed mass flow command signals. The upper limit is input to a minimum selecting circuit 260. An output of the maximum selecting circuit 240 is also input to the minimum selecting circuit 260.

The LUT 254 selects a lower limit for the manifold pressure based on the summed mass flow command signals. The lower limit is output to a maximum selecting circuit 264. The output of the minimum selecting circuit 260 is also input to the maximum selecting circuit 264. The LUT 256 selects a pressure setpoint providing optimum efficiency based on the summed mass flow command signals. The optimum efficiency pressure setpoint is input to a maximum selecting circuit 268. The output of the maximum selecting circuit 264 is also input to the maximum selecting circuit 268. An output of the maximum selecting circuit 268 is a desired manifold pressure setpoint. The summed mass flow commands are compared to zero. If the summed mass flow commands are not greater than zero as determined by a comparing circuit 270, the desired manifold pressure is set equal to zero by a multiplier 272. The desired manifold pressure setpoint is used to control the air delivery device 24.

Referring now to FIG. 7, a solving circuit 280 receives an output of a maximum selector circuit 278, the LUT 254, the summed mass flow commands, and other system efficiency factors 282. The solving circuit 280 generates a desired manifold pressure setpoint that is output to the multiplier 272 as in FIG. 7. The desired manifold pressure setpoint is used to control the air delivery device 24.

Note that the number of airflow branches can vary from one fuel cell system to another. FIGS. 6 and 7 show three branches (POx air, Combustor air, and Stack Cathode Air). Additional or fewer airflow branches can employed. Also, the present invention can work with any number or combination of the three factors. For example, if the optimization map is selected within the boundaries of the air delivery device, the boundary check can be eliminated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An air control system for a fuel cell system, comprising:
    a manifold;
    an air delivery device that supplies air to said manifold;
    a plurality of fuel cell components;
    a plurality of flow controllers (FCs) that control airflow from said manifold to said fuel cell components; and
    a controller that communicates with said FCs and said air delivery device and that generates a manifold pressure setpoint based on a first factor that is related to fuel cell system stability and a second factor that is a based on minimum and maximum pressures of said air delivery device for a predetermined airflow.

2. The air control system of claim 1 wherein said controller generates said manifold pressure setpoint based on a third factor that is related to fuel cell system efficiency.

3. The air control system of claim 1 wherein when said controller calculates said first factor, said controller uses a first mass flow signal of a first FC of a first component to look up a first delta pressure minimum in a first table, adds said first delta pressure minimum to a first pressure of air delivered to said first component, and generates a first pressure minimum.

4. The air control system of claim 3 wherein said first pressure is sensed using a pressure sensor.

5. The air control system of claim 3 wherein said first pressure is modeled using system inputs.

6. The air control system of claim 3 wherein when said controller calculates said first factor, said controller uses a second mass flow signal of a second FC of a second component to look up a second delta pressure minimum in a second table, adds said second delta pressure minimum to a second pressure of air delivered to said second component, and generates a second pressure minimum.

7. The air control system of claim 6 further comprising a first maximum selecting circuit that selects a first maximum value of inputs thereto, wherein said first and second pressure minimums are input to said first maximum selecting circuit.

8. The air control system of claim 7 further comprising a summing circuit that sums inputs thereto, and wherein said first and second mass flow signals are input to said summing circuit.

9. The air control system of claim 8 further comprising an upper limit table that generates a high pressure limit for said air delivery device based on said summed mass flow signals.

10. The air control system of claim 9 further comprising a first minimum selecting circuit that selects a first minimum value of said first maximum value and said upper pressure limit.

11. The air control system of claim 10 further comprising a lower limit table that generates a low pressure limit for said air delivery device based on said summed mass flow signals.

12. The air control system of claim 11 further comprising a second maximum selecting circuit that selects a second maximum value of inputs thereto, wherein said lower pressure limit and said first minimum value are input to said second maximum selecting circuit.

13. The air control system of claim 12 further comprising an efficiency table that provides an efficiency pressure valve based on said summed mass flow signals.

14. The air control system of claim 13 further comprising a third maximum selecting circuit that selects a third maximum value based on said efficiency pressure valve and said second maximum value.

15. The air control system of claim 8 further comprising a low limit table that generates a low pressure limit based on said summed mass flow signals.

16. The air control system of claim 15 further comprising a second maximum selecting circuit that selects a second maximum value from inputs thereto, wherein said first maximum value and said lower pressure limit are input to said maximum selecting circuit.

17. The air control system of claim 16 further comprising:
    an upper limit table that generates an upper pressure limit based on said summed mass flow signals; and
    an efficiency table that generates an efficiency pressure value based on said summed mass flow signals.

18. The air control system of claim 17 further comprising a solving circuit that generates a manifold setpoint pressure based on said upper pressure limit, said second maximum value, and said summed mass flow signals.

19. The air control system of claim 18 wherein said manifold setpoint pressure that is generated by said solving circuit is also based on at least one other system efficiency factor.

* * * * *